US011160156B2

(12) United States Patent
Leiteritz

(10) Patent No.: US 11,160,156 B2
(45) Date of Patent: Oct. 26, 2021

(54) PLASMA TORCH SYSTEMS HAVING IMPROVED PLASMA NOZZLES

(75) Inventor: Nathan Gerald Leiteritz, Greenville, WI (US)

(73) Assignee: Illinois Tool Works Inc., Glenview, IL (US)

( * ) Notice: Subject to any disclaimer, the term of this patent is extended or adjusted under 35 U.S.C. 154(b) by 577 days.

(21) Appl. No.: 13/428,958

(22) Filed: Mar. 23, 2012

(65) Prior Publication Data

US 2012/0241418 A1 Sep. 27, 2012

Related U.S. Application Data

(60) Provisional application No. 61/467,448, filed on Mar. 25, 2011.

(51) Int. Cl.
*H05H 1/34* (2006.01)
*B23K 10/00* (2006.01)

(52) U.S. Cl.
CPC .............. *H05H 1/34* (2013.01); *B23K 10/00* (2013.01); *H05H 1/3478* (2021.05)

(58) Field of Classification Search
CPC . B23K 10/00; B23K 9/00; H05H 1/34; H05H 2001/3478; H05H 2001/3421; H05H 1/32; H05H 2001/3494
USPC .............. 219/121.5, 121.36, 121.51, 121.59, 219/121.54
See application file for complete search history.

(56) References Cited

U.S. PATENT DOCUMENTS

| 4,999,901 | A | * | 3/1991 | Toratani | B21C 37/16 29/415 |
| 5,214,263 | A | * | 5/1993 | Sakuragi | H05H 1/34 219/121.5 |
| 5,266,776 | A | | 11/1993 | Boisver et al. | |
| 5,736,708 | A | | 4/1998 | Delzenne | |
| 5,880,426 | A | * | 3/1999 | Fukui et al. | 219/121.49 |
| 5,893,985 | A | | 4/1999 | Luo et al. | |
| 2003/0201257 | A1 | * | 10/2003 | Crawmer | 219/121.47 |
| 2005/0103752 | A1 | * | 5/2005 | Zapletal et al. | 219/121.5 |

(Continued)

FOREIGN PATENT DOCUMENTS

CN 2276240 3/1998
CN 1194889 10/1998
(Continued)

OTHER PUBLICATIONS

International Search Report & Written Opinion of PCT/US2012/030431 dated Jul. 4, 2012.

*Primary Examiner* — Tu B Hoang
*Assistant Examiner* — Diallo I Duniver
(74) *Attorney, Agent, or Firm* — McAndrews, Held & Malloy, Ltd.

(57) ABSTRACT

Nozzles for plasma torches and plasma torch systems utilizing such nozzles are provided herein. One such nozzle may include a body having a first end, a second end having an exit orifice disposed therein, and a passageway extending from the first end to the second end and adapted to enable the flow of plasma gas from the first end, through the passageway, and to the exit orifice. Greater than or equal to approximately 50% of an overall mass of the body is distributed between the second end and a midpoint of the body with respect to a longitudinal length of the body.

6 Claims, 3 Drawing Sheets

(56) References Cited

U.S. PATENT DOCUMENTS

| | | | | |
|---|---|---|---|---|
| 2005/0133484 A1* | 6/2005 | Delzenne | ................ | H05H 1/34 |
| | | | | 219/121.5 |
| 2008/0057212 A1 | 3/2008 | Dorier | | |
| 2008/0083708 A1* | 4/2008 | Hussary | ................ | H05H 1/34 |
| | | | | 219/121.5 |
| 2008/0217305 A1* | 9/2008 | Sanders | ................ | H05H 1/28 |
| | | | | 219/121.49 |
| 2009/0057277 A1 | 3/2009 | Renault | | |
| 2011/0240460 A1* | 10/2011 | Begounov | ................ | H05H 1/34 |
| | | | | 204/164 |

FOREIGN PATENT DOCUMENTS

| | | |
|---|---|---|
| CN | 201669503 | 12/2010 |
| WO | 2010067306 A2 | 6/2010 |

* cited by examiner

PLASMA TORCH SYSTEMS HAVING IMPROVED PLASMA NOZZLES

CROSS REFERENCE TO RELATED APPLICATIONS

This application is Non-Provisional Application of U.S. Provisional Patent Application No. 61/467,448, entitled "Improved Plasma Nozzle Design with Increased Mass Forward," filed Mar. 25, 2011, which is herein incorporated by reference.

BACKGROUND

The invention relates generally to plasma cutting systems and, more particularly, to nozzles for a plasma torch for such systems.

Many current industries rely on the manipulation of metals for building a variety of structures, such as buildings, bridges, cranes, vehicles, and so forth. Due to the strength and durability of many metals, a variety of systems have been developed that enable the manipulation of these materials. One such system is a plasma cutting system that creates plasma (from high temperature ionized gas) for the cutting of metal or other electrically conductive material. In general, in plasma cutting systems, an electrical arc converts a gas (e.g., compressed air) into plasma, which is sufficiently hot to melt a metal workpiece while the pressure of the gas blows away the molten metal. The electrical arc is typically initiated in a plasma torch, and gas flows through the torch. As such, a plasma torch is used to direct and control the plasma for cutting. Accordingly, the plasma torch typically includes a variety of components, such as plasma nozzles or tips that focus plasma gas into a constricted arc, that enable this direction and control. As the tip of the plasma torch is dragged across the workpiece, the hot plasma cuts the workpiece along that path of the torch tip. Since the plasma torch nozzles are typically utilized in this manner, the nozzles are often manufactured from metals, such as copper, that have high thermal and electrical conductivity. Unfortunately, during operation, current plasma torch nozzles are subject to considerable degradation and must be replaced throughout use, thus increasing the monetary cost and inefficiency of the plasma cutting process.

BRIEF DESCRIPTION

In one embodiment, a nozzle for a plasma torch includes a body having a first end, a second end having an exit orifice disposed therein, and a passageway extending from the first end to the second end. The passageway enables the flow of plasma gas from the first end, through the passageway, and to the exit orifice. Greater than or equal to approximately 50% of an overall mass of the body is distributed between the second end and a midpoint of the body with respect to a longitudinal length of the body.

In another embodiment, a nozzle for a plasma torch includes a body having a first end and a second end having a plasma gas exit orifice disposed therein. A longitudinal distance from the first end to a center of mass of the body is greater than or equal to approximately 43% of a longitudinal length of the body.

In another embodiment, a nozzle for a plasma torch includes a body having a first end and a second end having a plasma gas exit orifice disposed therein. A longitudinal distance from the first end to a center of mass of the body is greater than or equal to approximately 48% of a longitudinal length of the body.

In another embodiment, a nozzle for a plasma torch includes a body having a first end, a second end having a plasma gas exit orifice disposed therein, a first portion extending from the first end along a longitudinal length of the body, an orifice portion extending from the second end along the longitudinal length of the body, and a middle portion disposed between the first portion and the orifice portion. An orifice ratio defined by an average wall thickness of the orifice portion divided by an inner diameter of the orifice portion is greater than or equal to approximately 3.6. A middle portion ratio defined by an average wall thickness of the middle portion divided by an inner diameter of the middle portion is greater than or equal to approximately 0.27.

In another embodiment, a nozzle for a plasma torch includes a body having a first end, a second end having a plasma gas exit orifice disposed therein, an orifice portion extending from the second end along the longitudinal length of the body, and a second portion extending from the first end along a longitudinal length of the body to the orifice portion. An orifice ratio defined by an average wall thickness of the orifice portion divided by an inner diameter of the orifice portion is greater than or equal to approximately 3.5.

In another embodiment, a plasma torch assembly includes a body and an electrode disposed within the body and adapted to receive power to enable generation of a plasma arc between the electrode and the workpiece. The assembly also includes a nozzle having a nozzle body having a first end and a second end having a plasma gas exit orifice disposed therein. A longitudinal distance from the first end to a center of mass of the nozzle body is greater than or equal to approximately 48% of a longitudinal length of the nozzle body, and an outer surface of the electrode and an inner annular wall of the nozzle define a plasma arc chamber.

In another embodiment, a plasma cutting system includes a plasma torch having a nozzle having a body having a first end and a second end having a plasma gas exit orifice disposed therein. A longitudinal distance from the first end to a center of mass of the body is greater than or equal to approximately 48% of a longitudinal length of the body. The system also includes a power source adapted to couple to the plasma torch and to provide a current to the plasma torch for generating a pilot arc and for maintaining a plasma cutting arc.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As described in more detail below, provided herein are embodiments of plasma torch nozzles having an increased concentration of mass proximate to the exit orifice of the nozzle. For example, in certain embodiments, the nozzle may include a body having greater than or equal to approximately 50% of the overall mass of the body distributed toward the exit orifice portion of the nozzle. The foregoing feature of presently disclosed embodiments may offer a variety of advantages over traditional systems that do not include an increased concentration of mass near the exit orifice. For example, presently contemplated embodiments may increase the local thermal capacity of the nozzle while reducing or eliminating the likelihood of overheating of the nozzle during operation. That is, during use in a plasma cutting operation, the face of the nozzle may be exposed to high temperatures arising from the plasma arc and blow back of molten material from the cut. By concentrating the mass of the body in the front portion of the nozzle about the exit orifice, presently disclosed embodiments of the nozzle may be more robust and resistant to wear from the arc and spatter than conventional designs.

Figure 1:
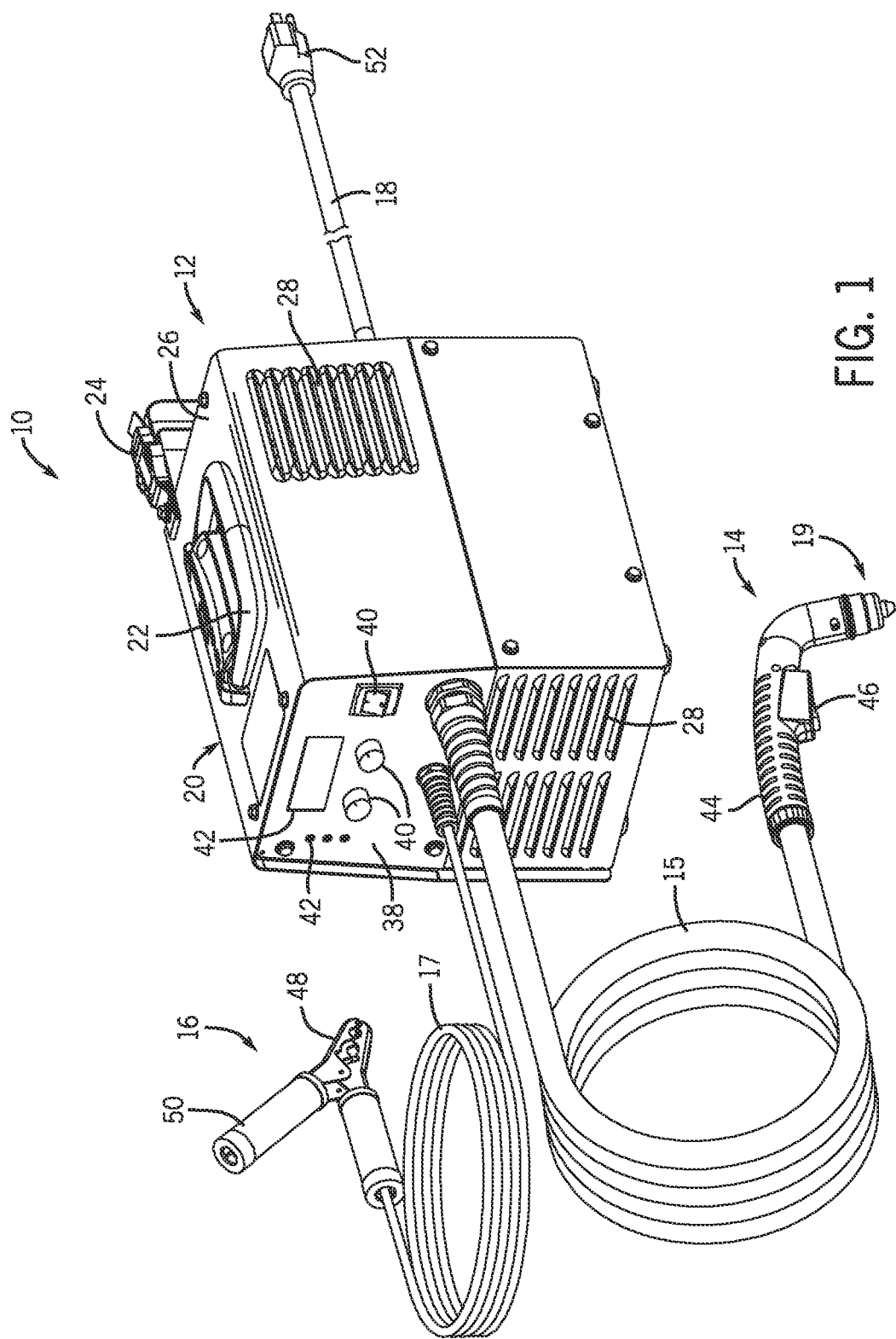
FIG. 1 is a perspective view of a plasma cutting system in accordance with embodiments of the present invention.

Referring now to the drawings, FIG. 1 is a perspective view illustrating an embodiment of a portable plasma cutting system 10. The illustrated plasma cutting system 10 includes a torch power unit 12 coupled to a plasma torch 14 and a workpiece clamp 16 via a torch cable 15 and a workpiece cable 17, respectively. As described further below with respect to FIGS. 2-4, the plasma torch 14 may include various features that provide improved performance and durability and longer usage life. For example, the plasma torch 14 may include a nozzle 19 capable of focusing plasma gas into a constricted arc during a plasma cutting operation. Here again, it should be noted that by concentrating the mass of the plasma nozzle near the exit orifice (i.e., closer to the workpiece during operation), a variety of improvements may be realized as compared to conventional designs.

The torch power unit 12 may be coupled to a power source (e.g., a power grid or a motor-driven generator) via a power cable 18. As described further below, the power source may provide a current to the torch 14 for starting and generating a pilot arc, and for maintaining plasma and a cutting arc. For example, the power unit 12 may be configured to supply a suitable voltage and current to create an electrical circuit from the unit 12, along the cable 15 to the torch 14, across a gap between the torch 14 and a work piece (e.g., as an electrical arc), through the work piece to the clamp 16, through the cable 17 back to the unit 12.

In the illustrated embodiment, the power unit 12 includes an enclosure 20 defining a generally closed volume to support various circuits, sensor features, control features, and gas supply features (e.g., air compressor). For example, the system 10 may include sensors and controls to adjust the power unit 10 to account for various conditions, e.g., altitude, temperature, pressure, and so forth. The illustrated system 10 also may include a handle 22 on the top side of the enclosure 20 to enable easier transportation of the system 10. The illustrated system 10 also may include a latching mechanism 24 that may secure the torch 14, the cable 17, the clamp 16, and/or the power cable 18. The enclosure 20 may also include vents 28 to relieve heat and/or pressure inside the system 10. It should be noted that in other embodiments, additional vents may be located on other panels of the enclosure 20.

In the illustrated system 10, a control panel 38 is included at an end of the power unit 12. The control panel 38 may include various control inputs, indicators, displays, electrical outputs, air outputs, and so forth. In an embodiment, a user input 40 may include a button, knob, or switch configured to enable selection of a mode of operation (e.g., plasma cut, gouge, etc.), power on/off, an output current level, gas (e.g., air) flow rate, gas (e.g., air) pressure, gas type, a work piece type, a control type (e.g., manual or automatic feedback control), or a combination thereof. The control panel 34 may also include various indicators 42 to provide feedback to the user. For example, the indicators 42 may include one or more light emitting diodes (LED) and/or liquid crystal displays (LCD) to display on/off status, current level, voltage level, gas (e.g., air) pressure, gas (e.g., air) flow, environmental conditions (e.g., altitude, temperature, pressure, etc.), or any other parameter. Additionally, the indicators 42 may include an LED or LCD that displays a trouble or warning indicator if there is a problem with the system 10. Embodiments of the control panel 38 may include any number inputs and outputs, such as welding methods, air compressor settings, oil pressure, oil temperature, and system power.

Further, the user inputs 40 and indicators 42 may be electrically coupled to control circuitry and enable a user to set and monitor various parameters of the system 10. For example, the indicators 42 may display environmental conditions (e.g., altitude, temperature, pressure, etc.) that prompt a user to manually adjust the current, voltage, gas flow rate, gas pressure, or other operational parameters, or a combination thereof.

The plasma torch 14 includes a handle 44 and a trigger 46 with a guard, as well as the nozzle 19, which may conform to a variety of implementation-specific features, as described below with respect to FIGS. 2-4. The clamp 16 includes an electrically conductive material clamping portion 48 having insulated handles 50. The power cable 18 includes a plug 52 for connection to a power source such as a wall socket or a motor-driven generator. The plug 52 may be configured to work with a variety of sockets or outlets, and the system 10 may receive different power sources, such as AC 50/60 Hz, 400 Hz, single or three phase 120V, 230V, 400V, 460V, 575V, any voltage in between such voltages, voltages exceeding the upper limit voltage, voltages below the lower limit voltage, and so forth.

It should be noted that the illustrated plasma cutting system 10 is merely an example, and in other embodiments, the system 10 is subject to a variety of implementation-specific modifications, as would be understood by one skilled in the art. For example, In some embodiments, the power unit 12 may be configured as a stationary, rather than a portable, unit. Additionally, the control panel 38 may include fewer or additional buttons, knobs, and so forth, as dictated by the demands of the given application. Indeed, it is presently contemplated that the plasma torch nozzles shown and described herein may be utilized with any plasma cutting torch associated with any plasma cutting system.

Figure 2:
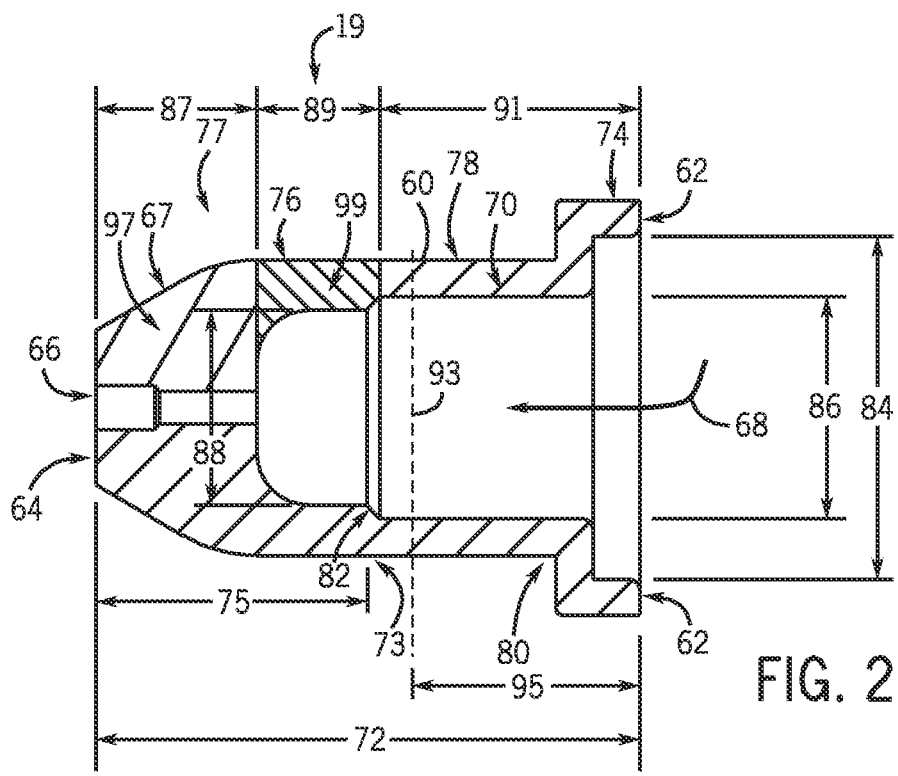
FIG. 2 is a cross sectional view of an embodiment of a plasma torch nozzle having an increased mass concentration proximate to an exit orifice of the nozzle in accordance with embodiments of the present invention.

FIG. 2 is a cross sectional view of an embodiment of the plasma torch nozzle 19 having an improved mass distribution in accordance with a presently disclosed embodiment. As illustrated, the nozzle 19 includes a body 60 having a first end 62 and a second end 64. As shown, an exit orifice 66 is disposed in the second end 64 of the body 60, which has a tapered edge 67. An internal passageway 68 extends from the first end 62 to the second end 64. In the illustrated embodiment, an inner annular wall 70 of the nozzle 19 defines a series of portions along a longitudinal length 72 of the body 60 having a midpoint 73 defined by midpoint length 75.

Specifically, the illustrated body 60 includes a portion 74 proximate to the first end 62 and included in a first end portion 78, a middle portion 76, and an orifice portion 77 proximate to the second end 64. A length of the orifice portion 77 is defined by orifice portion length 87, a length of the middle portion 76 is defined by middle portion length 89, and a length of the first end portion 78 is defined by first end portion length 91. Further, a substantially perpendicular annular step 80 is included in the first end portion 78 while a recessed annular or angled step 82 is provided in the middle portion 76. As such, in the illustrated embodiment, the foregoing structure defines a first inner diameter 84, a second inner diameter 86, and a third inner diameter 88 of the body 60.

As noted above, in certain embodiments, the provided plasma torch nozzle 19 may include one or more features resulting in an increased concentration of mass proximate to the exit orifice 66 of the nozzle body 60 and, thus, improving the robustness and resistivity to heat of the nozzle 19 during use in a plasma cutting operation. Specifically, in one embodiment, a ratio of the average wall thickness to the inner diameter of certain portions of the body 60 may be improved compared to conventional designs. More specifically, an average wall thickness of the orifice portion 77 may be given by the cross sectional area indicated by hatched portion 97 in FIG. 2 divided by the orifice length 87. This average wall thickness of the orifice portion 77 may then be divided by the inner diameter of the orifice portion 77 to give an orifice ratio of the average wall thickness to the inner diameter. In one embodiment, the orifice ratio may be greater than or equal to approximately 3.25. In another embodiment, the orifice ratio may be greater than or equal to approximately 3.6. Still further, in other embodiments, the orifice ration may be greater than or equal to between approximately 3.25 and approximately 4.

Similarly, the average wall thickness of the middle portion 76 may be given by the cross sectional area indicated by hatched portion 99 in FIG. 2 divided by the middle portion length 89. This average wall thickness of the middle portion 76 may then be divided by the inner diameter of the middle portion 76 to give a middle portion ratio of the average wall thickness to the inner diameter. In one embodiment, the middle portion ratio may be greater than or equal to approximately 0.25. In another embodiment, the orifice ratio may be greater than or equal to approximately 0.27.

As indicated by dashed line 93 in FIG. 2, the nozzle 19 includes a center of mass that lies at the center of mass location 93 along the length 72 of the nozzle body 60. Accordingly, a center of mass distance 95 is defined from the first end 62 of the body 60 to the center of mass 93 of the body 60. In certain embodiments, the center of mass 93 may lie at or near the longitudinal midpoint 73. For example, in one embodiment, the center of mass distance 95 may be greater than or equal to approximately 43% of the body length 72. In another embodiment, the center of mass distance 95 may be greater than or equal to approximately 48% of the body length 72. Still further, in other embodiments, the center of mass distance 95 may be greater than or equal to between approximately 45% and approximately 55% of the body length 72. By shifting the center of mass 93 toward the first end 62 rather than the second end 64, presently disclosed embodiments may increase the local thermal capacity of the nozzle around the exit orifice 66 while reducing or eliminating the likelihood of overheating of the nozzle 19 during operation. That is, by concentrating the mass of the body in the front portion of the nozzle body 60 and about the exit orifice 66, presently disclosed embodiments of the nozzle 19 may be more robust and resistant to wear from the arc and spatter than conventional designs.

In some embodiments, greater than or equal to approximately 50% of the overall mass of the nozzle body 60 is distributed between the second end 64 and the midpoint 73 of the body 60 with respect to the longitudinal length 72 of the nozzle body 60. As such, in these embodiments, the thickness of the material surrounding the exit orifice 66 may be increased as compared to traditional nozzles. As mentioned above, the foregoing feature may offer a variety of advantages both during normal plasma cutting events as well as during transient events in which the nozzle 19 may be utilized as a heat sink. For example, during the pilot arc, the nozzle 19 may function as a temporary anode to which the arc attaches in order to complete the secondary circuit. Since the anode bears much of the heat from the arc during the cutting process, having greater than 50% of the mass of the body distributed near the second end 64 of the nozzle 19 where the pilot arc attaches may improve the lifespan of the nozzle 19.

Further, during reverse transfer events, when the nozzle 19 may come into circuit to become the temporary anode, the power supply 14 will reduce the output current to pilot current levels to reduce or prevent the likelihood that damage will occur to the nozzle 19. However, in certain instances, the power supply may not change from cut current to pilot current quickly enough, and the nozzle 19 may therefore have to conduct a quantity greater than the pilot current for a period of time. In such instances, the concentration of the mass of the body 60 near the second end 64 may enable better absorption and dissipation of the heat generated during these transient over current events that typically occur during reverse transfer events.

Presently contemplated embodiments of the plasma torch nozzles 19 may be made of a variety of types of suitable materials. For example, the nozzle 19 may be partially or fully formed from metallic materials, such as copper, or any other desired electrically conductive material. Still further, embodiments of the nozzles 19 described herein may be disposable rather than reusable and, as such, may be configured as consumable components of the plasma torch assembly.

Figure 3:
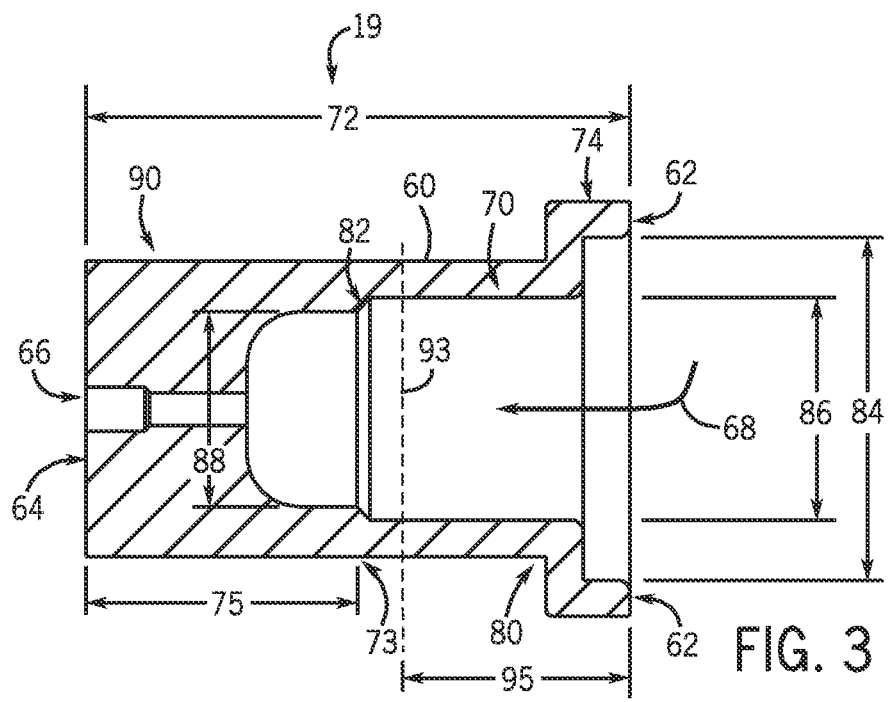
FIG. 3 is a cross sectional view of an embodiment of the plasma torch nozzle of FIG. 2 having an untapered end portion in accordance with embodiments of the present invention.
Figure 4:
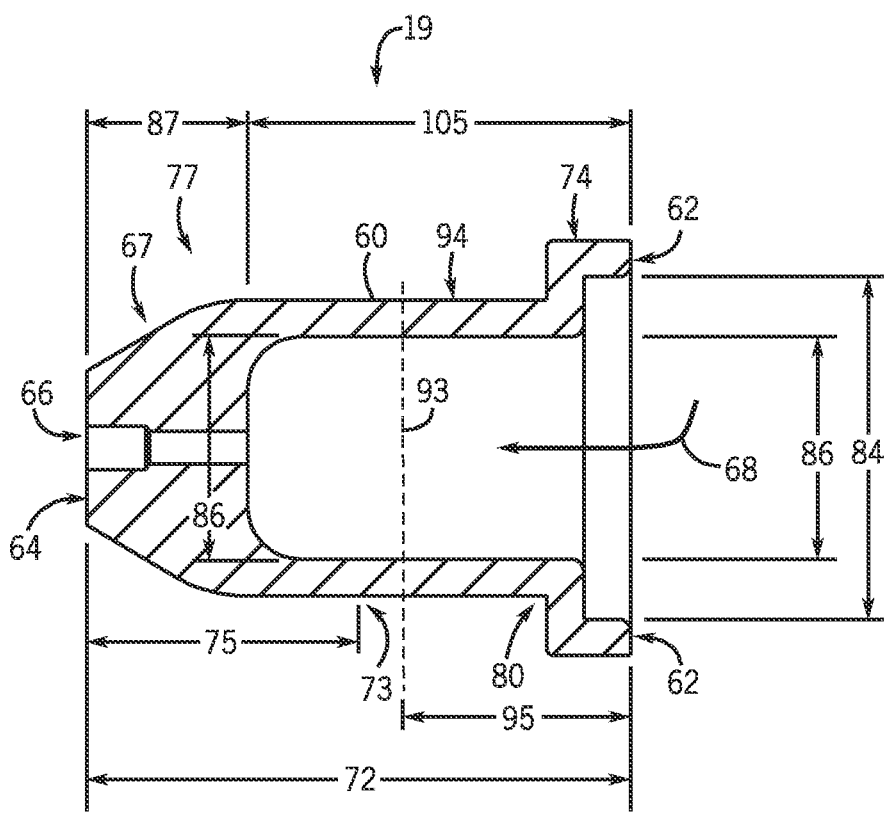
FIG. 4 is a cross sectional view of an embodiment of the plasma torch nozzle of FIG. 2 having an inner annular wall with a substantially constant diameter in accordance with embodiments of the present invention.

FIGS. 3 and 4 illustrate additional embodiments of the plasma torch nozzle 19 shown in FIG. 2. Specifically, FIG. 3 illustrates a cross sectional view of an embodiment of the nozzle 19 having a non-tapered or non-angled edge 90 proximate to the second end 64 of the body 60. That is, in this embodiment, additional body mass is concentrated around the exit orifice 66 as compared to the embodiment of FIG. 2. Here again, greater than or equal to approximately 50% of the overall mass of the nozzle body 60 is distributed between the second end 64 and the midpoint 73 of the body 60 with respect to the longitudinal length 72 of the nozzle body 60.

In the embodiment illustrated in FIG. 4, the nozzle body 60 includes orifice portion 77 having orifice length 87 and a portion 94 having portion length 105, but does not include stepped portion 82. As such, in this embodiment, the body 60 includes only two inner diameters 84 and 86 instead of three inner diameters as in the embodiments of FIGS. 2 and 3. As illustrated, in this embodiment, portions 76 and 78 are a single portion 94. Here again, the average wall thickness of the orifice portion 77 may be divided by the inner diameter of the orifice portion 77 to give an orifice ratio of the average wall thickness to the inner diameter, and the orifice ratio may be greater than or equal to approximately 3.6. It should be noted that while in the embodiments of FIGS. 2 and 3, the electrode may be received by the stepped portion 82, in the embodiment of FIG. 4 an alternate receiving mechanism may be provided, and the electrode may rest, for example, within portion 94 of the body 60.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A nozzle for a plasma torch, comprising:
a body comprising a first end, a second end having an exit orifice disposed therein, and a single cavity extending from the first end to the second end and configured to guide the flow of plasma into the first end, through the single cavity, to the exit orifice, wherein the single cavity comprises:
a first portion proximate to the first end comprising:
a first inner diameter;
a first outer diameter; and
a first cylindrical surface joining an annular radial surface in a right angle;
a second portion proximate to the exit orifice of the second end comprising a second inner diameter smaller than the first inner diameter, and a second outer diameter smaller than the first outer diameter;
a third portion extending between the first portion and the second portion, coupled to the second portion via a tapered step, the third portion comprising a second cylindrical surface having a third inner diameter smaller than the first inner diameter and larger than the second inner diameter, and having a step change from the first outer diameter to the second outer diameter, wherein the annular radial surface joins the second cylindrical surface at a right angle; and
the exit orifice comprising a fourth inner diameter smaller than the second inner diameter, and at least a portion of the second end of the body having the second outer diameter; and
wherein greater than 50% of an overall mass of the body is distributed between the second end and a midpoint of the body with respect to a longitudinal length of the body.

2. The nozzle of claim 1, wherein the body comprises a metallic material.

3. The nozzle of claim 2, wherein the metallic material comprises copper.

4. The nozzle of claim 1, wherein the body comprises an annular inner wall having a stepped diameter.

5. The nozzle of claim 1, wherein greater than 25% of the overall mass of the body is distributed throughout the second portion.

6. The nozzle of claim 1, wherein a distance from the first end to a center of mass of the body is between 48% and 50% of the longitudinal length of the body.

* * * * *